(12) United States Patent
Nishibashi et al.

(10) Patent No.: US 9,322,664 B2
(45) Date of Patent: Apr. 26, 2016

(54) MAP DISPLAY DEVICE

(75) Inventors: Kumi Nishibashi, Tokyo (JP); Takashi Irie, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1093 days.

(21) Appl. No.: 12/994,294

(22) PCT Filed: Jul. 3, 2009

(86) PCT No.: PCT/JP2009/003100
§ 371 (c)(1),
(2), (4) Date: Nov. 23, 2010

(87) PCT Pub. No.: WO2010/001621
PCT Pub. Date: Jan. 7, 2010

(65) Prior Publication Data
US 2011/0106420 A1    May 5, 2011

(30) Foreign Application Priority Data

Jul. 4, 2008 (JP) ................................. 2008-175756

(51) Int. Cl.
*G01C 21/36*    (2006.01)
(52) U.S. Cl.
CPC .......... *G01C 21/3667* (2013.01); *G01C 21/367* (2013.01); *G01C 21/3658* (2013.01)
(58) Field of Classification Search
CPC ........... G01C 21/3658; G01C 21/3667; G01C 21/367; G01C 21/3461; G01C 21/26; G01C 21/32; G01C 21/34; G01C 21/3697; G08G 1/0969; G08G 2310/04; G08G 2330/021; G08G 2340/125; G08G 2360/18; G08G 5/02; G08G 5/14; B66F 9/063; G04R 20/02
USPC .......... 701/400, 532–533, 408–410; 340/995.1, 990
See application file for complete search history.

(56) References Cited

U.S. PATENT DOCUMENTS

| | | | |
|---|---|---|---|
| 6,295,503 B1 * | 9/2001 | Inoue et al. .................... | 701/410 |
| 2001/0021895 A1 | 9/2001 | Yamazaki | |
| 2005/0055158 A1 | 3/2005 | Machino | |
| 2005/0071080 A1 * | 3/2005 | Sano ............................. | 701/209 |
| 2007/0050134 A1 | 3/2007 | Hayashida et al. | |
| 2008/0288163 A1 * | 11/2008 | Asano ........................... | 701/118 |
| 2010/0070164 A1 | 3/2010 | Machino | |
| 2010/0094549 A1 * | 4/2010 | Machino ........................ | 701/209 |
| 2011/0015859 A1 * | 1/2011 | Kim et al. ..................... | 701/201 |

FOREIGN PATENT DOCUMENTS

| | | |
|---|---|---|
| JP | 4-315192 A | 11/1992 |
| JP | 2001-183159 A | 7/2001 |
| JP | 2005-61988 A | 3/2005 |
| JP | 2005-83758 A | 3/2005 |
| JP | 2007-86052 A | 4/2007 |
| JP | 3908425 B2 | 4/2007 |
| WO | WO 2008/068949 A1 | 6/2008 |

\* cited by examiner

*Primary Examiner* — Nga X Nguyen
(74) *Attorney, Agent, or Firm* — Birch, Stewart, Kolasch & Birch, LLP

(57) ABSTRACT

A map display device includes a map data acquiring unit 21 for acquiring map data, an HOV lane determining unit 26 for determining whether or not HOV lane information showing that an HOV lane exists is included in link data defining roads included in the map data acquired by the map data acquiring unit, a display processing unit 28 for, when the HOV lane determining unit determines that HOV lane information is included in the link data, creating display data showing that a symbol showing an HOV lane is superimposed on a road formed by the link data including the HOV lane information, and a display unit 6 for displaying a map on the basis of the display data created by the display processing unit.

15 Claims, 12 Drawing Sheets

Symbol Showing HOV Lane

Guidance Point Mark

Guidance Section Mark

Entrance/Exit Section

MAP DISPLAY DEVICE

FIELD OF THE INVENTION

The present invention relates to a map display device which is applied to, for example, a vehicle-mounted navigation device. More particularly, it relates to a technology of displaying a map by using map information including HOV lane (High Occupancy Vehicle Lane) information.

BACKGROUND OF THE INVENTION

A conventional vehicle-mounted navigation device displays the current position of a vehicle on a digital map (referred to as a "map" from here on) displayed on a display unit while superimposing the current position of the vehicle on the map. Furthermore, the conventional vehicle-mounted navigation device searches for a route leading from the current position of the vehicle to a destination, and displays the recommended route on the map. In addition, the conventional vehicle-mounted navigation device carries out route guidance on the recommended route on the basis of map information read from a recording medium.

By the way, a car pool lane (Car Pool Lane) or the like which is used in a road. system mainly seen in, for example, a North American big city is known as a road on which restrictions showing which vehicles can enter the road are imposed. A car pool lane is also called an HOV lane and is a lane along which only vehicles with two or more people are allowed to travel. A special lane disposed along with lanes on a freeway, a lane which is a shortcut of an interchange, etc. are known as car pool lanes. A road system which adopts such a car pool lane provides users with a preferential treatment that makes it possible to arrive at the destination in a shorter time as long as they travel along a carpool lane so as to prod users to share a vehicle with one or more people, thereby reducing the traffic as a whole and therefore reducing traffic congestions.

As a technology related to such a car pool lane, patent reference 1 discloses a navigation device that enables a vehicle to efficiently travel along a lane on which restrictions showing which vehicles can enter the lane from another lane and exit the lane to enter another lane are imposed. This navigation device reads map data including road information about entering and exiting points in each highway equipped with a car pool lane from a DVD, and stores the map data in a data buffer. A route search processing unit performs a route searching process in consideration of whether or not car pool lanes can be used by using the map data stored in the data buffer. When performing a route guidance using car pool lanes, a carpool lane guidance unit performs a predetermined lane change guidance using an image and voice at a time when each of the entering and exiting points at which the vehicle should change its travelling direction falls within an area at a predetermined distance or less from the position of the vehicle.

Patent reference 2 discloses a route searching device that can perform a search for a route in consideration of the conditions of a vehicle through an easy operation. This route searching device includes a map data acquiring unit for acquiring map data defined by nodes and road links, a route searching unit for searching for a route leading to a destination in consideration of road links included in the map data acquired by this map data acquiring unit and each corresponding to a particular road (e.g., an HOV lane) before the conditions of the vehicle are set up, whether or not the vehicle can travel the particular road being determined according to the conditions of the vehicle, and an output unit for outputting information about the route which is searched for by this route searching unit.

RELATED ART DOCUMENT

Patent References

[Patent reference 1] JP,2001-183159, A
[Patent reference 2] JP,2005-83758, A

A problem with such conventional technologies as disclosed by above-mentioned patent references 1 and 2 is, however, that no information about HOV lanes is displayed on the map, and it is therefore difficult for the user to recognize whether an HOV lane exists and the position of an HOV lane visually even if the user looks at the map displayed on the screen.

The present invention is made in order to solve the above-mentioned problem, and it is therefore an object of the present invention to provide a map display device that enables the user to visually and easily recognize an HOV lane on a map displayed on the screen thereof.

SUMMARY OF THE INVENTION

In order to solve the above-mentioned problems, in accordance with the present invention, there is provided a map display device including: a map data acquiring unit for acquiring map data; an HOV lane determining unit for determining whether or not HOV lane information showing that an HOV lane exists is included in link data defining roads included in the map data acquired by the map data acquiring unit; a display processing unit for, when the HOV lane determining unit determines that HOV lane information is included in the link data, creating display data for displaying a road formed of the link data including this HOV lane information in a display form different from that in which a road formed of link data not including any HOV lane information is displayed; and a display unit for displaying a map on the basis of the display data created by the display processing unit.

Because the map display device in accordance with the present invention thus enables the user to grasp the existence or nonexistence of an HOV lane and its location visually and easily on the map displayed on the screen, the user can use the HOV lane easily.

EMBODIMENTS OF THE INVENTION

Hereafter, the preferred embodiments of the present invention will be explained in detail with reference to the drawings. Hereafter, a case in which a map display device in accordance with each embodiment of the present invention is applied to a navigation device will be explained.

Embodiment 1

Figure 1:
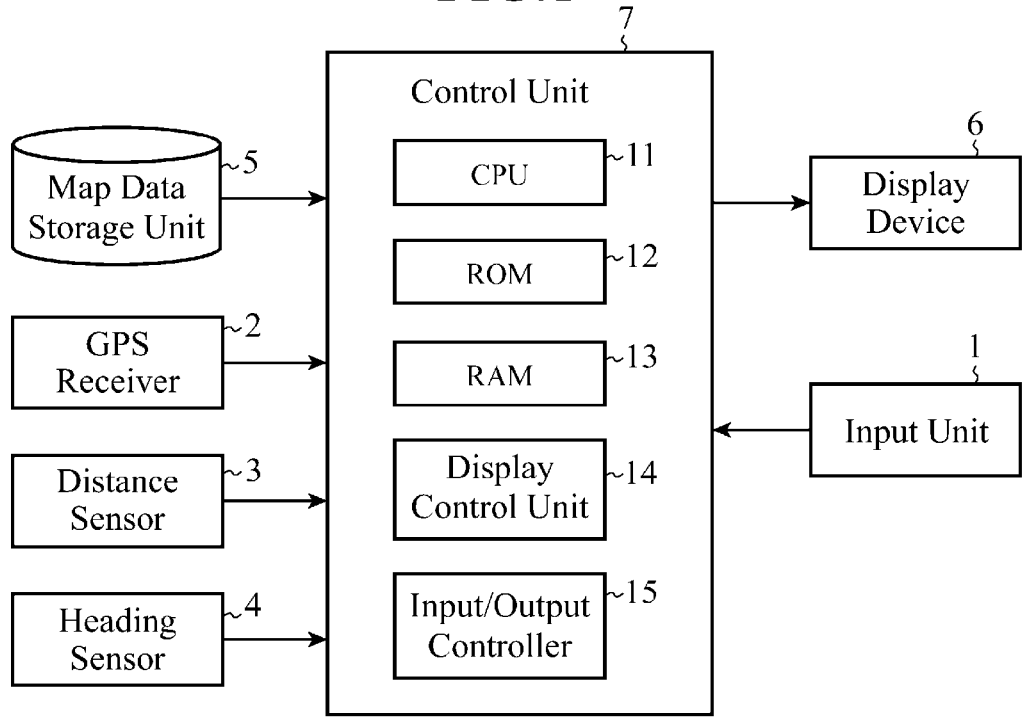
FIG. 1 is a block diagram showing the hardware configuration of a map display device in accordance with Embodiment 1 of the present invention.

FIG. 1 is a block diagram showing the hardware configuration of a map display device in accordance with Embodiment 1 of the present invention. This navigation device is provided with an input unit 1, a GPS (Global Positioning System) receiver 2, a distance sensor 3, a heading sensor 4, a map data storage unit 5, a display unit 6, and a control unit 7.

The input unit 1 is comprised of, for example, a touch panel placed on the screen of the display unit 6. This input unit 1 is used in order for a user to set a place of departure, a destination, a waypoint, or the like for a route search, or to provide one of various commands to the navigation device, for example. Information inputted from this input unit 1 is sent to the control unit 7 as an operation signal.

The GPS receiver 2 detects the current position of a vehicle on the basis of GPS signals received from GPS satellites. The current position of the vehicle detected by this GPS receiver 2 is informed to the control unit 7 as a current position signal. The distance sensor 3 detects the travelled distance of the vehicle. The travelled distance detected by this distance sensor 3 is informed to the control unit 7 as a distance signal. The heading sensor 4 detects the heading toward which the vehicle is heading. The heading detected by this heading sensor 4 is informed to the control unit 7 as a heading signal.

The map data storage unit 5 is comprised of, for example, an HDD (Hard Disk Drive) device, and stores various types of data for implementing a navigation function as well as digitized map data, such as link data and node data which define roads. In a case in which an HOV lane exists in a road link shown by link data, the link data includes HOV lane information showing that the HOV lane exists in the road link (e.g., information about the position of the HOV lane, and information about an HOV time restriction). Data stored in this map data storage unit 5 can be read by the control unit 7. The map data storage unit 5 is not limited to the HDD device, and can be alternatively comprised of a drive device for reading data from a DVD (Digital Versatile Disk) or a CD (Compact Disc) mounted thereto, or one of various types of storage units, such as a semiconductor memory device.

The display unit 6 is comprised of, for example, an LCD (Liquid Crystal Display), and displays a map, a route, a vehicle position mark, various pieces of guidance information, etc. on the screen thereof according to an image signal sent thereto from the control unit 7.

The control unit 7 performs a display process of displaying a map, a route search process, a route guidance process, or the like, and also controls the whole of the navigation device, as will be mentioned below in detail. This control unit 7 is provided with a CPU (Central Processing Unit) 11, a ROM (Read Only Memory) 12, a RAM (Random Access Memory) 13, a display control unit 14, and an input/output controller 15.

The CPU 11 uses the RAM 13 as a work memory and operates according to a program read from the ROM 12 so as to perform various processes, such as a route search and extraction of guide points. The ROM 12 stores programs and data which the CPU 11 reads to perform the various processes. The RAM 13 is used as the work memory of the CPU 11, as mentioned above, and temporarily stores data being arithmetic-processed (e.g., expanded map data).

The display control unit 14 controls the display unit 6. Concretely, the display control unit 14 converts display data created by the CPU 11 into an image signal, and sends this image signal to the display unit 6 via the input/output controller 15. The input/output controller 15 functions as an interface between the control unit 7, and the input unit 1, the GPS receiver 2, the distance sensor 3, the heading sensor 4, the map data storage unit 5 and the display unit 6 which are connected to the control unit 7, and controls transmission and reception of signals among these components.

Figure 2:
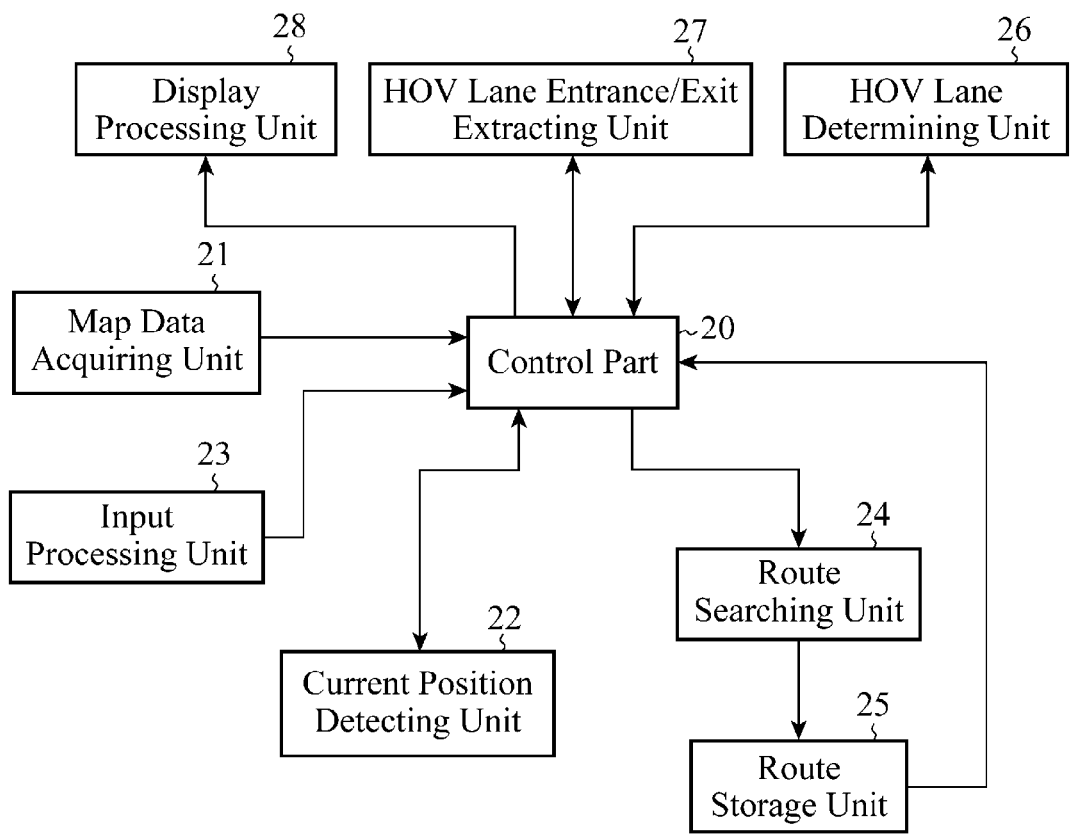
FIG. 2 is a functional block diagram showing the functional configuration of a control unit of the map display device in accordance with Embodiment 1 of the present invention.

Next, the details of functions implemented by the control unit 7 will be explained. FIG. 2 is a functional block diagram showing the functional configuration of the control unit 7. The control unit 7 is provided with a control part 20, a map data acquiring unit 21, a current position detecting unit 22, an input processing unit 23, a route searching unit 24, a route storage unit 25, an HOV lane determining unit 26, an HOV lane entrance/exit extracting unit 27, and a display processing unit 28. These components except the route storage unit 25 are implemented through program processes performed by the CPU 11.

The control part 20 controls the whole of the control unit 7. For example, the control part 20 controls start and stop of the map data acquiring unit 21, the current position detecting unit 22, the input processing unit 23, the route searching unit 24, the route storage unit 25, the HOV lane determining unit 26, the HOV lane entrance/exit extracting unit 27, and the display processing unit 28, and transmission and reception of data among them. The map data acquiring unit 21 acquires map data from the map data storage unit 5, and sends the map data to the control part 20.

The current position detecting unit 22 detects the current position of the vehicle on the basis of both the current position signal sent thereto from the GPS receiver 2 or a current position signal which the current position detecting unit has created with dead reckoning by using the heading signal sent thereto from the heading sensor 4 and the distance signal sent thereto from the distance sensor 3, and the map data acquired from the map data acquiring unit 21 via the control part 20. The current position of the vehicle detected by this current position detecting unit 22 is informed to the control part 20 as current position data.

The input processing unit 23 analyzes the operation signal sent thereto from the input unit 1, and sends data showing the place of departure, the destination, or the waypoints which the input processing unit has acquired through this analysis to the control part 20.

The route searching unit 24 searches for a route leading from the current position (the place of departure) shown by the current position data sent thereto, via the control part 20, from the current position detecting unit 22 to the destination shown by the data showing the destination sent thereto, via the control part 20, from the input processing unit 23 on the basis of the map data acquired from the map data acquiring unit 21 via the control part 20. The route which this route searching unit 24 has searched for is informed to the route storage unit 25 as route data.

The route storage unit 25 is disposed in, for example, apart of the RAM 13 of the control unit 7, and stores the route data sent thereto from the route searching unit 24. The route data stored in this route storage unit 25 can be read by the control part 20.

The HOV lane determining unit 26 determines whether or not HOV lane information showing that an HOV lane exists is included in either link data which define roads included in the map data acquired from the map data acquiring unit 21 via the control part 20 or link data which define the route shown by the route data acquired from the route storage unit 25 via the control part 20, and, when HOV lane information is included in either of those link data, sends the link data to the control part 20 as data showing the position of the HOV lane.

The HOV lane entrance/exit extracting unit 27 extracts entrance/exits of the HOV lane disposed on the road or the route which is formed by the link data which are determined to include the HOV lane information by the HOV lane determining unit 26, i.e., both an entrance via which vehicles are allowed to enter the HOV lane from another lane other than the HOV lane and an exit via which vehicles are allowed to exit the HOV lane to another lane other than the HOV lane, creates entrance/exit section position data showing sections respectively including these extracted entrance/exits of the HOV lane, and sends the entrance/exit section position data to the control part 20.

The display processing unit 28 creates display data for displaying the map based on the map data acquired from the map data acquiring unit 21 via the control part 20, the route based on the route data acquired from the route storage unit 25 via the control part 20, the road or the route including the HOV lane determined by the HOV lane determining unit 26, and the sections respectively including the entrance/exits of the HOV lane which are extracted by the HOV lane entrance/exit extracting unit 27. The display data created by this display processing unit 28 are converted into an image signal by the display control unit 14, and the image signal is sent to the display unit 6 via the input/output controller 15.

Figure 3:
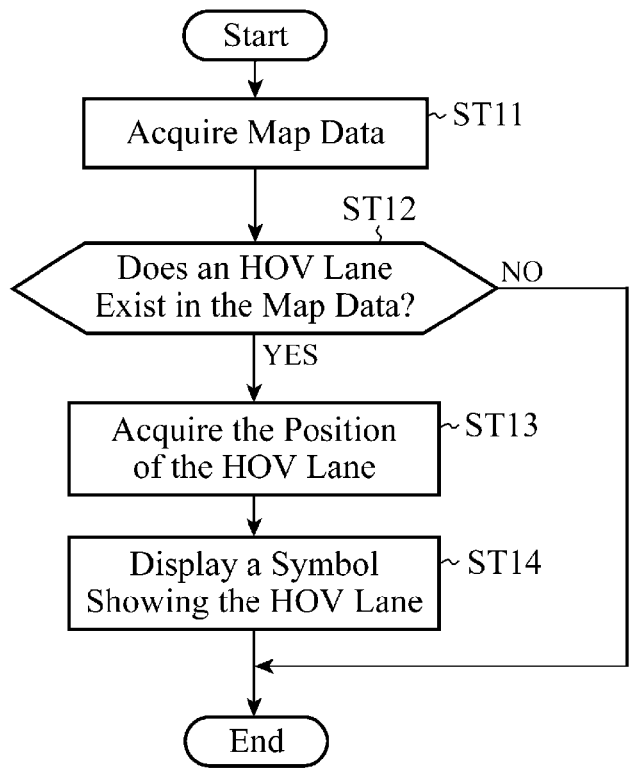
FIG. 3 is a flow chart showing the operation of the map display device in accordance with Embodiment 1 of the present invention, focusing on an HOV lane display process.

Next, the operation of the map display device in accordance with Embodiment 1 of the present invention configured as mentioned above will be explained with reference to a flow chart shown in FIG. 3, focusing on a process of displaying information about HOV lanes (referred to as an "HOV lane display process" from here on).

In the HOV lane display process, map data are acquired first (step ST11). More specifically, the map data acquiring unit 21 acquires map data corresponding to a map to be displayed on the screen of the display unit 6 from the map data storage unit 5.

Whether or not an HOV lane exists in the map data is then checked to see (step ST12). More specifically, the HOV lane determining unit 26 checks to see whether or not HOV lane information is included in the link data which define the roads included in the map data acquired from the map data acquiring unit 21 via the control part 20.

When it is determined, in this step ST12, that an HOV lane exists in the map data, the position of the HOV lane is then acquired (step ST13). More specifically, when determining that HOV lane information is included in the link data which define the roads included in the map data, the HOV lane determining unit 26 sends data showing the position of the HOV lane to the display processing unit 28 via the control part 20.

Figure 4:
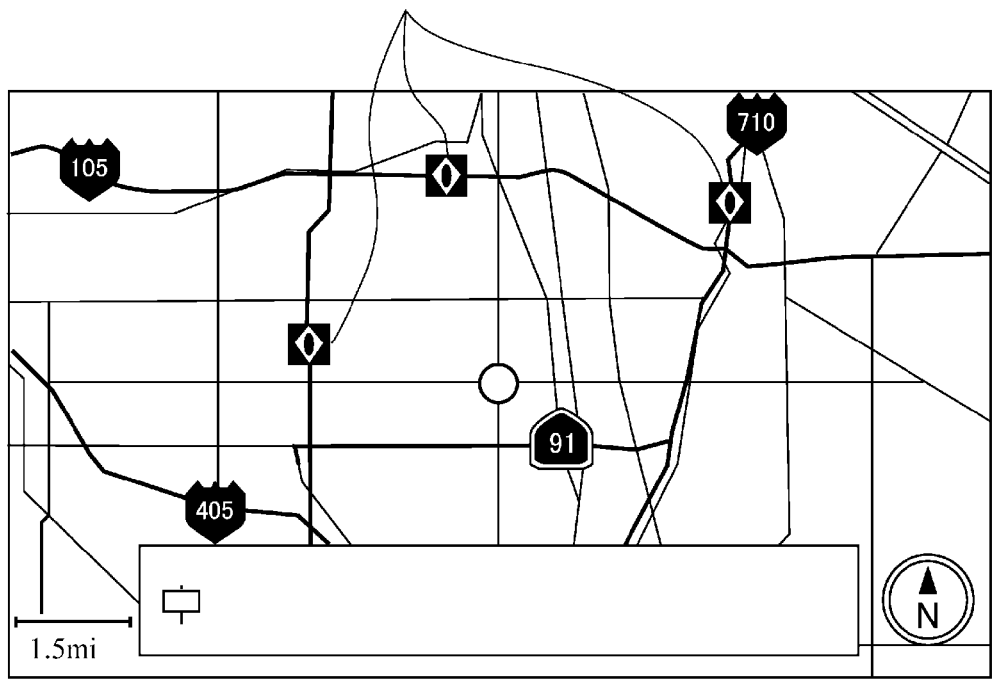
FIG. 4 is a display example of a map displayed on the screen of a display unit in the map display device in accordance with Embodiment 1 of the present invention.

A symbol showing the HOV lane is then displayed (step ST14). More specifically, the display processing unit 28 creates display data in which the symbol showing the HOV lane is superimposed at the position shown by the data showing the HOV lane position sent from the HOV lane determining unit 26, the position being on one of the roads created on the basis of the map data acquired from the map data acquiring unit 21 via the control part 20, and sends the display data to the display unit 6. As a result, the symbol showing the HOV lane is displayed on the road where the HOV lane exists on the screen of the display unit 6, as shown in, for example, FIG. 4. After that, the HOV lane display process is ended.

When it is determined, in above-mentioned step ST12, that no HOV lane is included in the acquired map data, the HOV lane display process is ended. In this case, no symbol showing an HOV lane is displayed on the screen.

As explained above, because the map display device in accordance with Embodiment 1 of the present invention enables the user to always grasp the location at which an HOV lane exists on the map displayed on the screen of the display unit 6, the user can easily use the HOV lane.

Embodiment 2

A map display device in accordance with Embodiment 2 of the present invention has the same structure as the map display device in accordance with Embodiment 1 shown in FIGS. 1 and 2.

Figure 5:
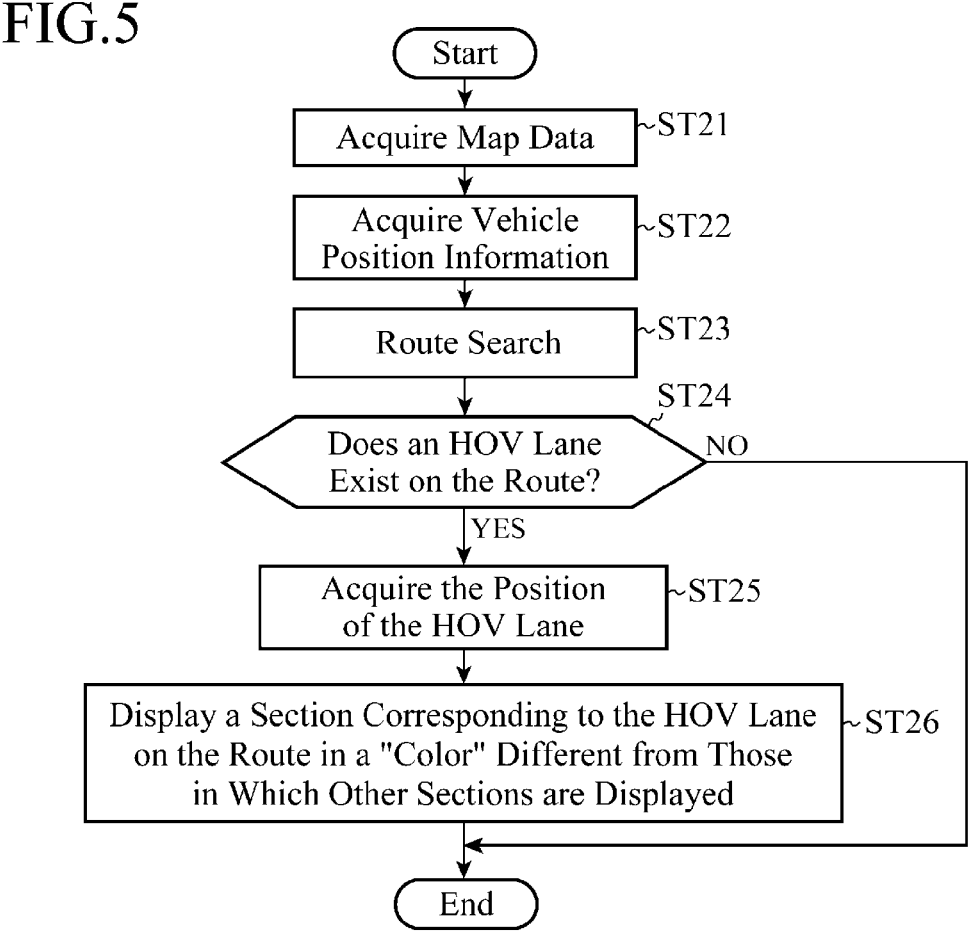
FIG. 5 is a flow chart showing the operation of a map display device in accordance with Embodiment 2 of the present invention, focusing on an HOV lane display process.

Next, the operation of the map display device in accordance with Embodiment 2 of the present invention will be explained with reference to a flow chart shown in FIG. 5, focusing on an HOV lane display process. In the HOV lane display process, map data are acquired first (step ST21). The process of this step ST21 is the same as that of step ST11 of the flow chart shown in FIG. 3.

Vehicle position information is then acquired (step ST22). More specifically, a current position detecting unit 22 detects the current position of the vehicle on the basis of both a current position signal sent thereto from a GPS receiver 2 or a current position signal which the current position detecting unit has created with dead reckoning by using a heading signal sent thereto from a heading sensor 4 and a distance signal sent thereto from a distance sensor 3, and the map data acquired from a map data acquiring unit 21 via a control part 20, and informs the current position of the vehicle to a route searching unit 24 via the control part 20 as current position data.

Then, a route search is carried out (step ST23). More specifically, a route searching unit 24 searches for a route leading from the current position (a place of departure) shown by the current position data sent thereto, via the control part 20, from the current position detecting unit 22 to a destination shown by destination data sent thereto, via the control part 20, from an input processing unit 23 on the basis of the map data acquired from the map data acquiring unit 21 via the control part 20, and informs the route which the route searching unit has searched for through this search to a route storage unit 25 as route data to make the route storage unit store the route data.

Whether or not an HOV lane exists on the route searched for in step ST23 is then checked to see (step ST24). More specifically, an HOV lane determining unit 26 checks to see whether or not HOV lane information is included in the link data which define the route shown by the route data acquired from the route storage unit 25 via the control part 20. When it is determined, in this step ST24, that an HOV lane exists on the route, the position of the HOV lane is then acquired (step ST25). The process of this step ST25 is the same as that of step ST13 of the flow chart shown in FIG. 3.

Figure 6:
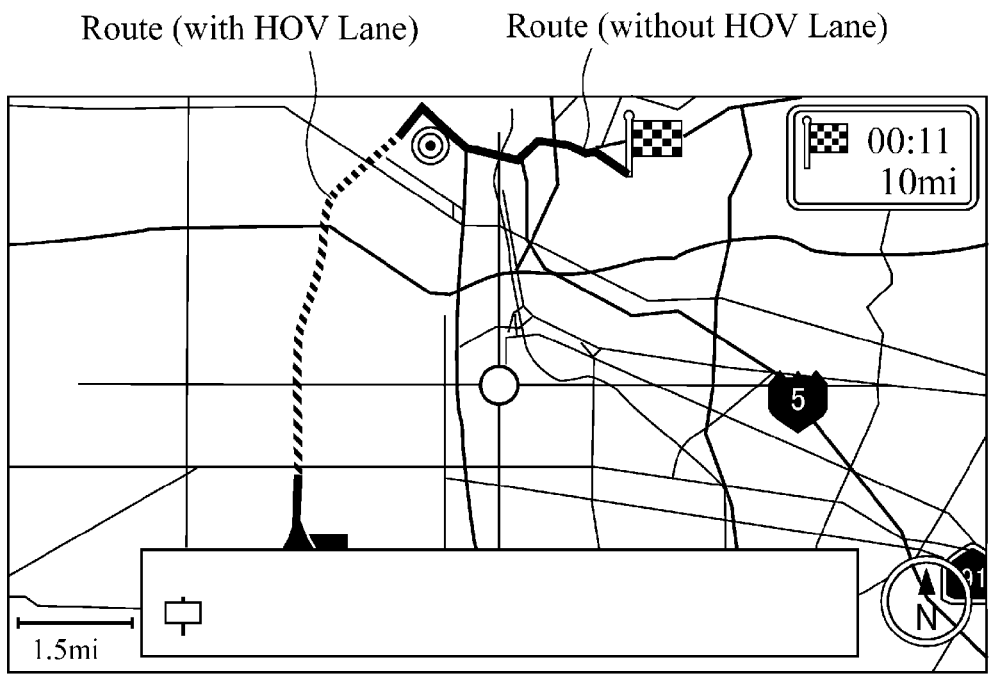
FIG. 6 is a display example of a map displayed on the screen of a display unit in the map display device in accordance with Embodiment 2 of the present invention.

A section corresponding to the HOV lane on the route is then displayed in a "color" different from those in which other sections are displayed (step ST26). More specifically, a display processing unit 28 creates display data for displaying the position shown by data showing the HOV lane position sent thereto from the HOV lane determining unit 26 on the route which is created on the basis of the route data acquired from the route storage unit 25 via the control part 20 in a color different those in which the other sections of the route are displayed, and sends the display data to a display unit 6. As a result, the section of the route in which the HOV lane exists is displayed on the screen of the display unit 6 in a color different from those in which the other sections of the route are displayed, as shown in, for example, FIG. 6. After that, the HOV lane display process is ended.

When it is determined, in above-mentioned step ST24, that no HOV lane exists on the route, the HOV lane display process is ended. In this case, the process of displaying a section corresponding to an HOV lane on the route in a special display form, such as displaying the HOV lane section in a "color" different from those in which the other sections are displayed, is not carried out.

As explained above, the map display device in accordance with Embodiment 2 of the present invention enables the user to know in advance that he or she will need to travel an HOV lane at which section of the route searched for. Therefore, when the user needs to change from a normal lane to an HOV lane or from an HOV lane to a normal lane, the map display device enables the user to pull the vehicle to a side nearer to the lane to which the user should change in advance, and to be prepared for the lane change.

The map display device in accordance with above-mentioned Embodiment 2 is configured in such a way as to display each HOV lane section on the route in a "color", as an example of the display form, different from those in which the other sections are displayed. As an alternative, the map display device in accordance with above-mentioned Embodiment 2 can be configured in such a way as to display each HOV lane section on the route using a different display form instead of the "color". For example, the map display device can display each HOV lane section on the route with a "width", a "shape", a "degree of brightness", or the like different from those in which the other sections are displayed.

Embodiment 3

A map display device in accordance with Embodiment 3 of the present invention has the same structure as the map display device in accordance with Embodiment 1 shown in FIGS. 1 and 2.

Figure 7:
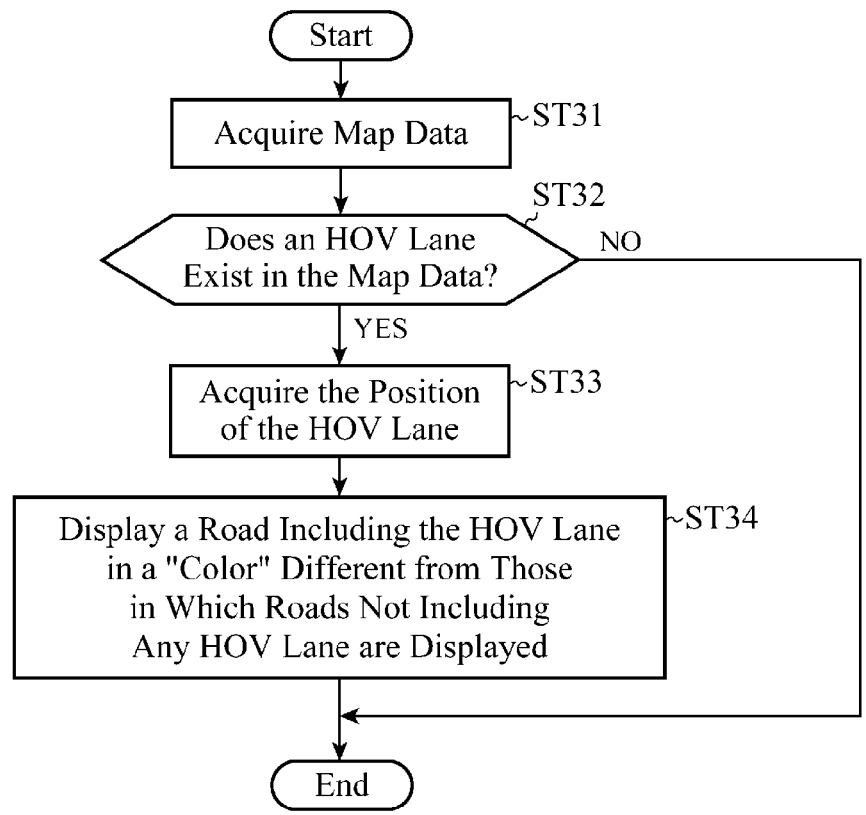
FIG. 7 is a flow chart showing the operation of a map display device in accordance with Embodiment 3 of the present invention, focusing on an HOV lane display process.

Next, the operation of the map display device in accordance with Embodiment 3 of the present invention will be explained with reference to a flow chart shown in FIG. 7, focusing on an HOV lane display process. In the HOV lane display process, map data are acquired first (step ST31). The process of this step ST31 is the same as that of step ST11 of the flow chart shown in FIG. 3.

Whether or not an HOV lane exists in the map data is then checked to see (step ST32). The process of this step ST32 is the same as that of step ST12 of the flow chart shown in FIG. 3. When it is determined, in this step ST32, that an HOV lane exists in the map data, the position of the HOV lane is then acquired (step ST33). The process of this step ST33 is the same as that of step ST13 of the flow chart shown in FIG. 3.

Figure 8:
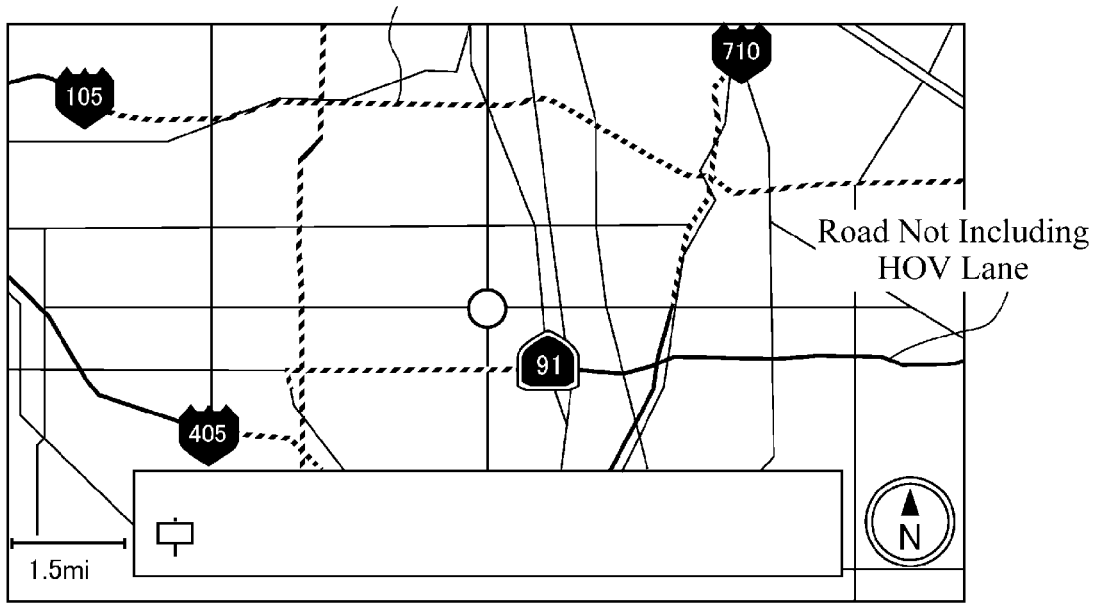
FIG. 8 is a display example of a map displayed on the screen of a display unit in the map display device in accordance with Embodiment 3 of the present invention.

The road including the HOV lane is then displayed in a "color" different from those in which roads not including any HOV lane are displayed (step ST34). More specifically, a display processing unit 28 creates display data for displaying the position shown by data showing the HOV lane position sent thereto from an HOV lane determining unit 26 on the road which is created on the basis of the map data acquired from a map data acquiring unit 21 via a control part 20 in a color different those in which the other roads not including any HOV lane are displayed, and sends the display data to a display unit 6. As a result, the road in which the HOV lane exists is displayed on the screen of the display unit 6 in a color different from those in which the other roads are displayed, as shown in, for example, FIG. 8. After that, the HOV lane display process is ended.

When it is determined, in above-mentioned step ST32, that no HOV lane is included in the acquired map data, the HOV lane display process is ended. In this case, the process of displaying a road including an HOV lane section in a special display form, such as displaying the road including the HOV lane in a "color" different from those in which the other roads not including any HOV lane are displayed, is not carried out.

As explained above, because the map display device in accordance with Embodiment 3 of the present invention enables the user to always grasp the location at which an HOV lane exists on the map displayed on the screen of the display unit 6, the user can easily use the HOV lane.

The map display device in accordance with above-mentioned Embodiment 3 is configured in such a way as to display a road in which an HOV lane exists in a "color", as an example of the display form, different from those in which the other roads are displayed. As an alternative, the map display device in accordance with above-mentioned Embodiment 3 can be configured in such a way as to display a road in which an HOV lane exists using a different display form instead of the "color". For example, the map display device can display a road in which an HOV lane exists with a "width", a "shape", a "degree of brightness", or the like different from those in which the other roads are displayed.

Embodiment 4

A map display device in accordance with Embodiment 4 of the present invention has the same structure as the map display device in accordance with Embodiment 1 shown in FIGS. 1 and 2.

Figure 9:
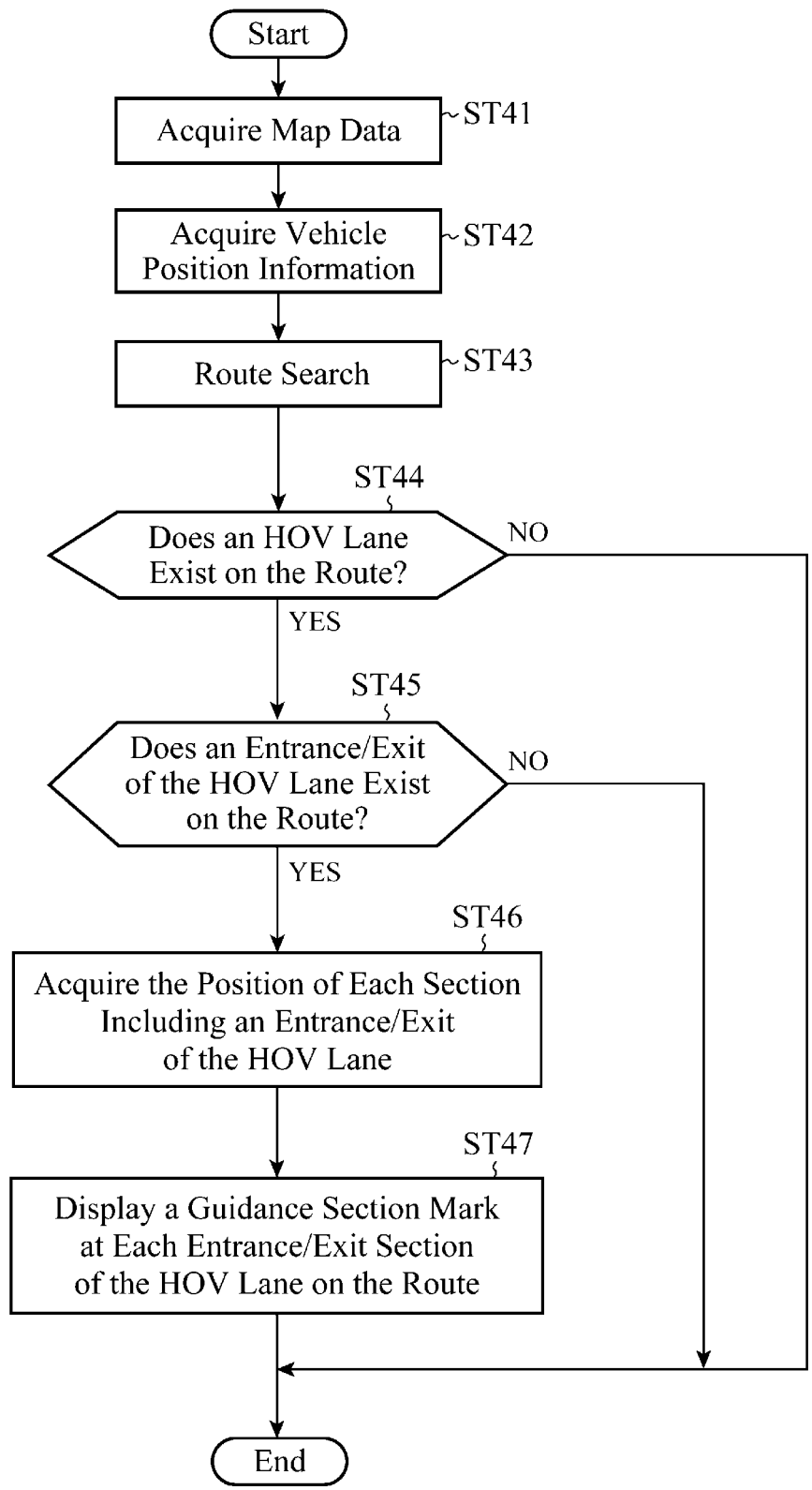
FIG. 9 is a flow chart showing the operation of a map display device in accordance with Embodiment 4 of the present invention, focusing on an HOV lane display process.

Next, the operation of the map display device in accordance with Embodiment 4 of the present invention will be explained with reference to a flow chart shown in FIG. 9, focusing on an HOV lane display process. In the HOV lane display process, map data are acquired first (step ST41). The process of this step ST41 is the same as that of step ST11 of the flow chart shown in FIG. 3.

Vehicle position information is then acquired (step ST42). The process of this step ST42 is the same as that of step ST22 of the flow chart shown in FIG. 5. Then, a route search is carried out (step ST43). The process of this step ST43 is the same as that of step ST23 of the flow chart shown in FIG. 5. Whether or not an HOV lane exists on the route searched for in step ST43 is then checked to see (step ST44). The process of this step ST44 is the same as that of step ST24 of the flow chart shown in FIG. 5.

When it is determined, in this step ST44, that an HOV lane exists on the route, whether an entrance/exit of the HOV lane exists on the route is then checked to see (step ST45). More specifically, an HOV lane entrance/exit extracting unit 27 extracts an entrance/exit of the HOV lane disposed on the route which is determined to include the HOV lane by an HOV lane determining unit 26. In this case, when an entrance/exit can be extracted, it is determined that an entrance/exit of the HOV lane exists on the route, whereas when no entrance/exit can be extracted, it is determined that no entrance/exit of the HOV lane exists on the route.

When it is determined in this step ST45 that an entrance/exit of the HOV lane exists on the route, the position of a section including each entrance/exit of the HOV lane is then acquired (step ST46). More specifically, the HOV lane entrance/exit extracting unit 27 creates entrance/exit section position data showing the section including each entrance/exit of the HOV lane on the basis of each entrance/exit of the HOV lane extracted in step ST45, and sends the entrance/exit section position data to a display processing unit 28 via a control part 20.

Figure 10:
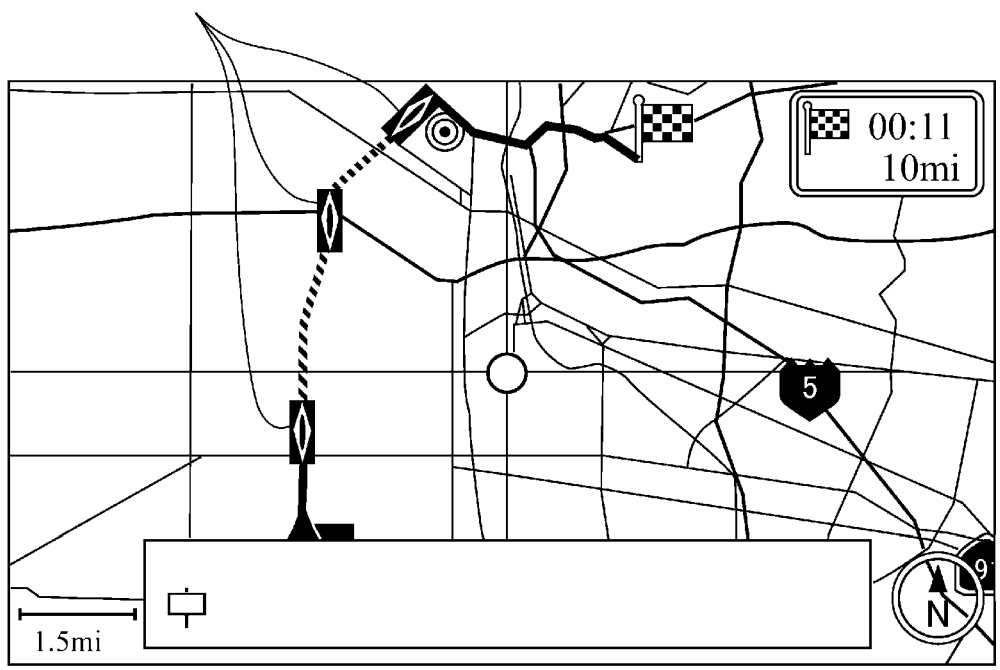
FIG. 10 is a display example of a map displayed on the screen of a display unit in the map display device in accordance with Embodiment 4 of the present invention.

A guidance section mark is then displayed at each entrance/exit section of the HOV lane on the route (step ST47). More specifically, the display processing unit 28 creates display data in which a guidance section mark is drawn at each entrance/exit section position shown by the entrance/exit section position data sent thereto from the HOV lane entrance/exit extracting unit 27, each entrance/exit section position being on the route created on the basis of route data acquired from a route storage unit 25 via the control part 20, and sends the display data to a display unit 6. As a result, the guidance section mark is displayed at each entrance/exit section of the HOV lane on the route on the screen of the display unit 6, as shown in, for example, FIG. 10. After that, the HOV lane display process is ended.

When it is determined, in above-mentioned step ST44, that no HOV lane exists on the route, the HOV lane display process is ended. In this case, the process of displaying a guidance section mark at each entrance/exit section of an HOV lane on the route is not carried out. Similarly, when it is determined, in above-mentioned step ST45, that no entrance/exit of the HOV lane exists on the route, the HOV lane display process is ended. Also in this case, the process of displaying a guidance section mark at each entrance/exit section of an HOV lane on the route is not carried out.

As explained above, the map display device in accordance with Embodiment 4 of the present invention enables the user to know the position at which the user should enter the HOV lane on the route and the position at which the user should exit the HOV lane on the route. Furthermore, because the guidance section mark is displayed, the user can know whether the user should change lanes in which section, and can change lanes at the user's own pace.

Embodiment 5

A map display device in accordance with Embodiment 5 of the present invention has the same structure as the map display device in accordance with Embodiment 1 shown in FIGS. 1 and 2.

Figure 11:
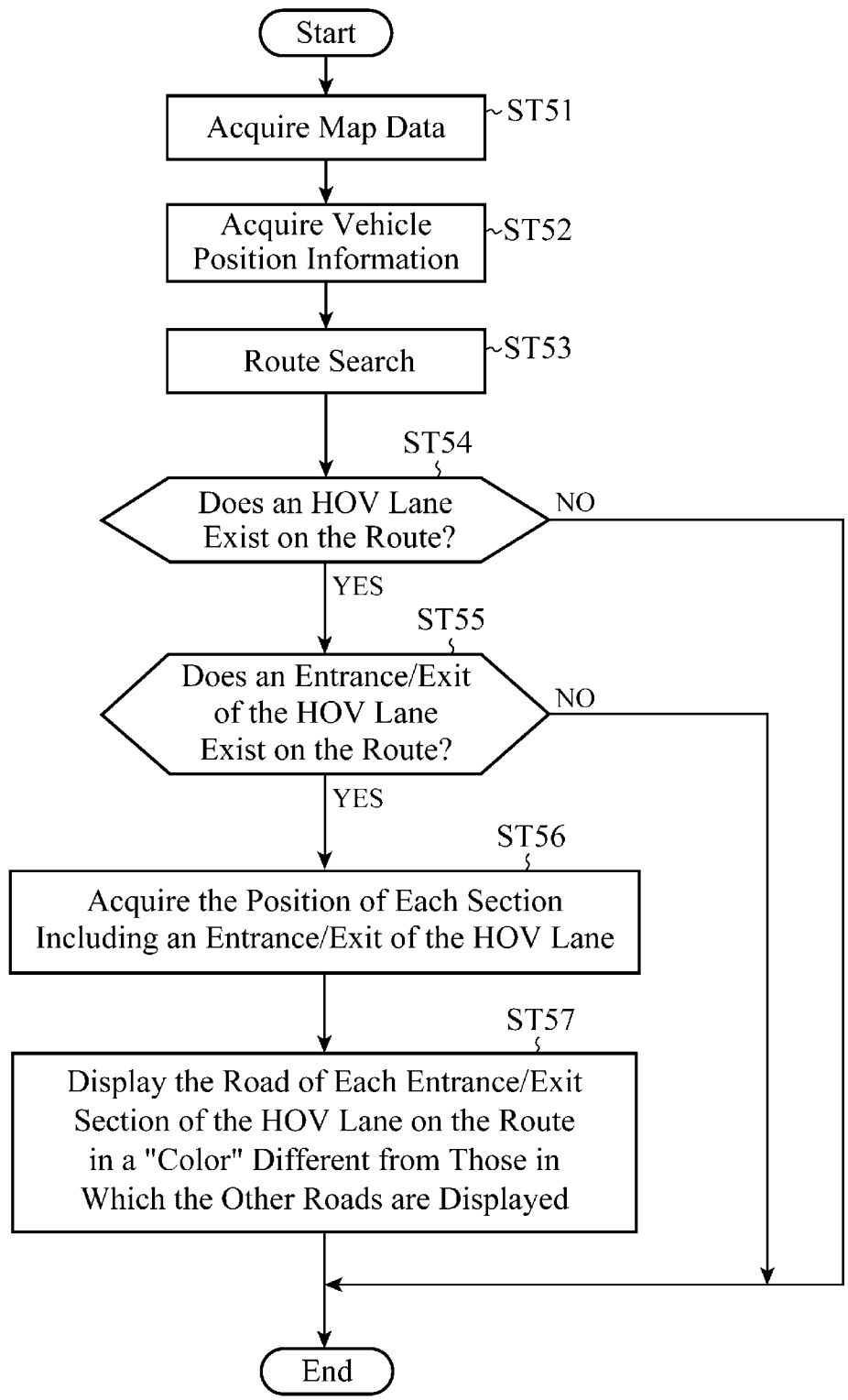
FIG. 11 is a flow chart showing the operation of a map display device in accordance with Embodiment 5 of the present invention, focusing on an HOV lane display process.

Next, the operation of the map display device in accordance with Embodiment 5 of the present invention will be explained with reference to a flow chart shown in FIG. 11, focusing on an HOV lane display process. In the HOV lane display process, map data are acquired first (step ST51). The process of this step ST51 is the same as that of step ST11 of the flow chart shown in FIG. 3.

Vehicle position information is then acquired (step ST52). The process of this step ST52 is the same as that of step ST22 of the flow chart shown in FIG. 5. Then, a route search is carried out (step ST53). The process of this step ST53 is the same as that of step ST23 of the flow chart shown in FIG. 5. Whether or not an HOV lane exists on the route searched for in step ST53 is then checked to see (step ST54). The process of this step ST54 is the same as that of step ST24 of the flow chart shown in FIG. 5.

When it is determined, in this step ST54, that an HOV lane exists on the route, whether an entrance/exit of the HOV lane exists on the route is then checked to see (step ST55). The process of this step ST55 is the same as that of step ST45 of the flow chart shown in FIG. 9. When it is determined in this step ST55 that an entrance/exit of the HOV lane exists on the route, the position of a section including each entrance/exit of the HOV lane is then acquired (step ST56). The process of this step ST56 is the same as that of step ST46 of the flow chart shown in FIG. 9.

Figure 12:
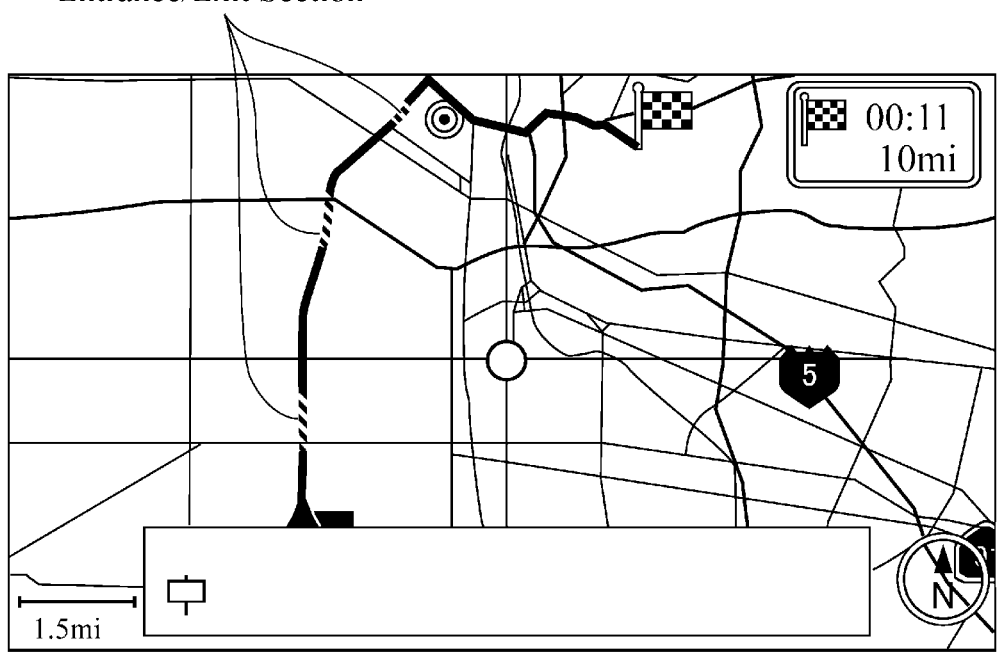
FIG. 12 is a display example of a map displayed on the screen of a display unit in the map display device in accordance with Embodiment 5 of the present invention.

The road of each entrance/exit section of the HOV lane on the route is then displayed in a "color" different from those in which the other roads are displayed (step ST57). More specifically, a display processing unit 28 creates display data for displaying the road link shown by the link data corresponding to each section shown by the entrance/exit section position data sent thereto from an HOV lane entrance/exit extracting unit 27 on the route which is created on the basis of route data acquired from a route storage unit 25 via a control part 20 in a "color" different those in which the other sections of the route are displayed, and sends the display data to a display unit 6. As a result, the road of each entrance/exit section of the HOV lane on the route is displayed in a "color" different from those in which the other roads are displayed on the screen of the display unit 6, as shown in, for example, FIG. 12. After that, the HOV lane display process is ended.

When it is determined, in above-mentioned step ST54, that no HOV lane exists on the route, the HOV lane display process is ended. In this case, the process of displaying the road of each entrance/exit section of an HOV lane on the route in a special display form, such as displaying the road in a "color" different from those in which the other roads are displayed, is not carried out. Similarly, when it is determined, in above-mentioned step ST55, that no entrance/exit of the HOV lane exists on the route, the HOV lane display process is ended. Also in this case, the process of displaying the road of each entrance/exit section of an HOV lane on the route in a special display form, such as displaying the road in a "color" different from those in which the other roads are displayed, is not carried out.

As explained above, the map display device in accordance with Embodiment 5 of the present invention enables the user to know the position at which the user should enter the HOV lane on the route and the position at which the user should exit the HOV lane on the route.

The map display device in accordance with above-mentioned Embodiment 5 is configured in such a way as to display each entrance/exit section on the route in a "color", as an example of the display form, different from those in which the other sections are displayed. As an alternative, the map display device in accordance with above-mentioned Embodiment 5 can be configured in such a way as to display each entrance/exit section on the route by using a different display form instead of the "color". For example, the map display device can display each entrance/exit section on the route with a "width", a "shape", a "degree of brightness", or the like different from those in which the other sections are displayed.

Embodiment 6

A map display device in accordance with Embodiment 6 of the present invention has the same structure as the map display device in accordance with Embodiment 1 shown in FIGS. 1 and 2.

Figure 13:
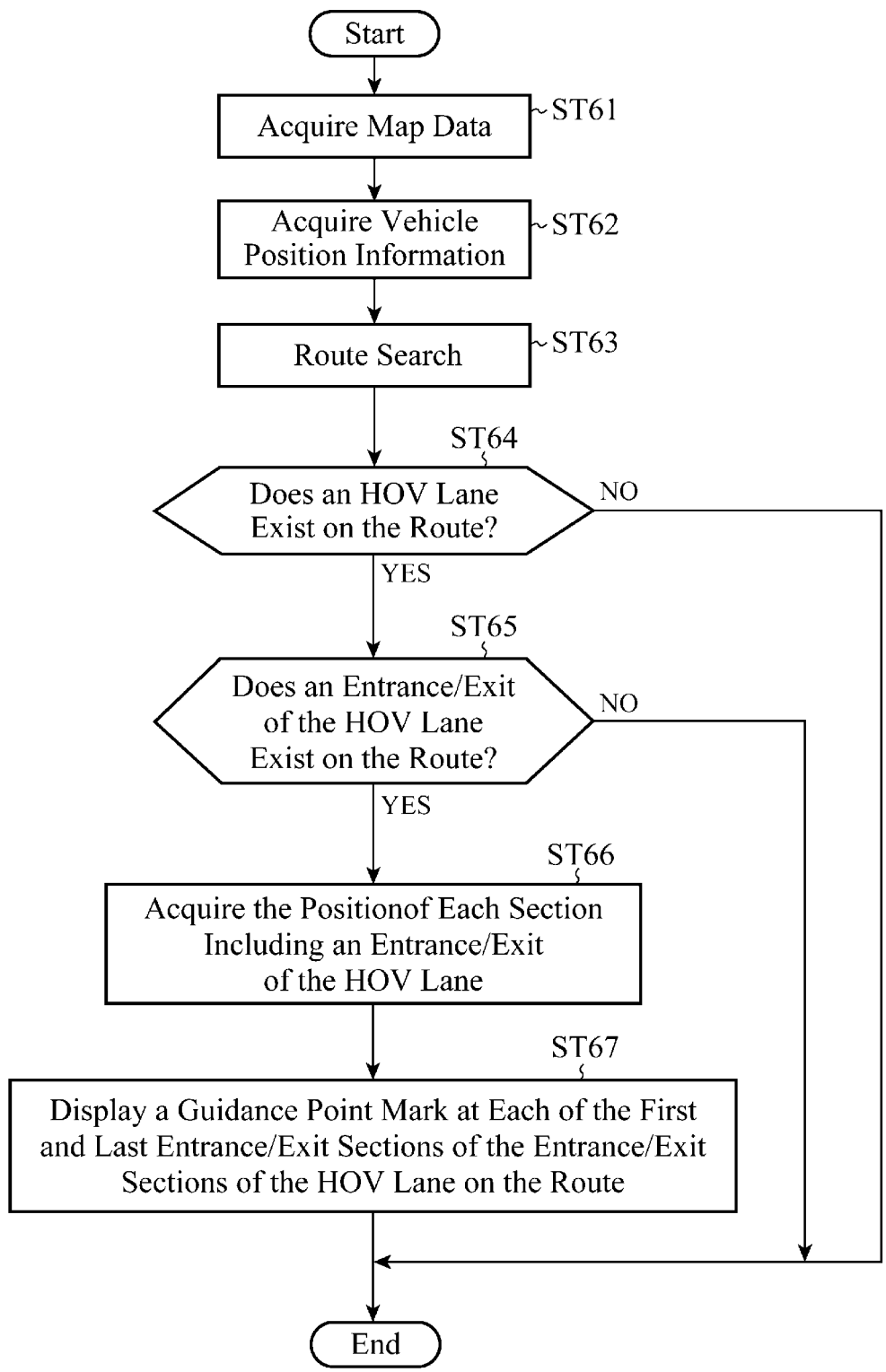
FIG. 13 is a flow chart showing the operation of a map display device in accordance with Embodiment 6 of the present invention, focusing on an HOV lane display process.

Next, the operation of the map display device in accordance with Embodiment 6 of the present invention will be explained with reference to a flow chart shown in FIG. 13, focusing on an HOV lane display process. In the HOV lane display process, map data are acquired first (step ST61). The process of this step ST61 is the same as that of step ST11 of the flow chart shown in FIG. 3.

Vehicle position information is then acquired (step ST62). The process of this step ST62 is the same as that of step ST22 of the flow chart shown in FIG. 5. Then, a route search is carried out (step ST63). The process of this step ST63 is the same as that of step ST23 of the flow chart shown in FIG. 5. Whether or not an HOV lane exists on the route searched for in step ST63 is then checked to see (step ST64). The process of this step ST64 is the same as that of step ST24 of the flow chart shown in FIG. 5.

When it is determined, in this step ST64, that an HOV lane exists on the route, whether entrance/exits of the HOV lane exist on the route is then checked to see (step ST65). The process of this step ST65 is the same as that of step ST45 of the flow chart shown in FIG. 9. When it is determined in this step ST65 that entrance/exits of the HOV lane exist on the route, the positions of entrance/exit sections respectively including the entrance/exits of the HOV lane is then acquired (step ST66). The process of this step ST66 is the same as that of step ST46 of the flow chart shown in FIG. 9.

Figure 14:
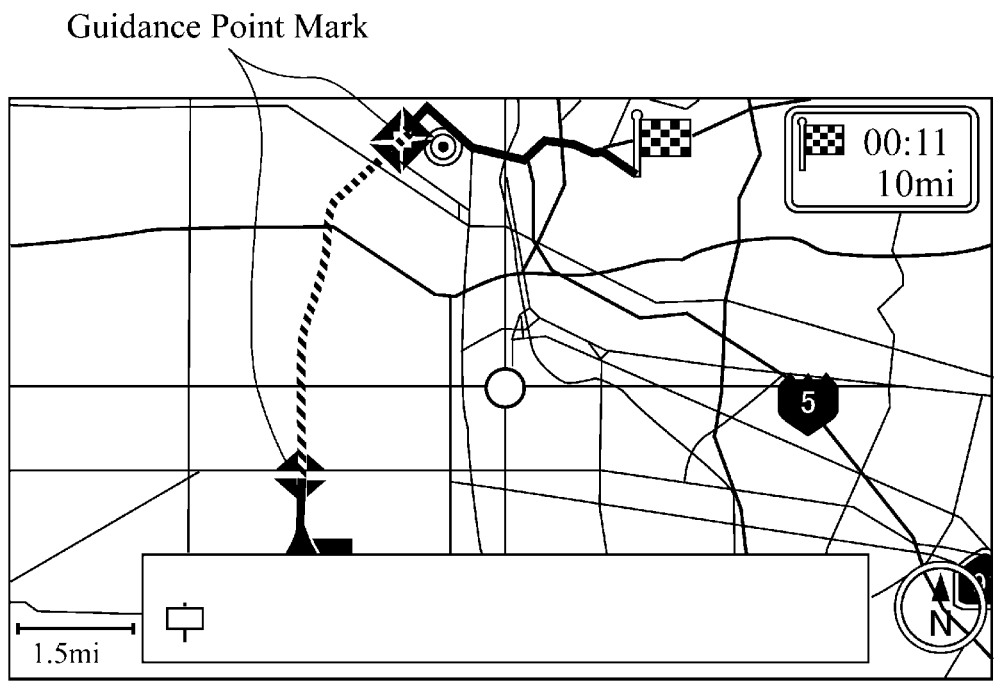
FIG. 14 is a display example of a map displayed on the screen of a display unit in the map display device in accordance with Embodiment 6 of the present invention.

A guide point mark is then displayed at each of first and last ones of the entrance/exit sections of the HOV lane on the route (step ST67). More specifically, a display processing unit 28 creates display data for drawing the guide point mark at each of the positions corresponding to the first and last ones of the entrance/exit sections on the route, the positions being included in the positions shown by the entrance/exit section position data sent thereto from an HOV lane entrance/exit extracting unit 27 and located on the route created on the basis of route data acquired from a route storage unit 25 via a control part 20, and sends the display data to a display unit 6. As a result, the guide point mark is displayed at each of the first and last ones of the entrance/exit sections on the route on the screen of the display unit 6, as shown in, for example, FIG. 14. After that, the HOV lane display process is ended.

When it is determined, in above-mentioned step ST64, that no HOV lane exists on the route, the HOV lane display process is ended. In this case, the process of displaying each of the first and last ones of the entrance/exit sections of an HOV lane on the route in a special display form, such as displaying the guide point mark at each of the first and last ones of the entrance/exit sections, is not carried out. Similarly, when it is determined, in above-mentioned step ST65, that no entrance/exit of the HOV lane exists on the route, the HOV lane display process is ended. Also in this case, the process of displaying each of the first and last ones of the entrance/exit sections of an HOV lane on the route in a special display form, such as displaying the guide point mark at each of the first and last ones of the entrance/exit sections, is not carried out.

As explained above, the map display device in accordance with Embodiment 6 of the present invention enables the user to know the position at which the user should enter the HOV lane on the route and the position at which the user should exit the HOV lane on the route. As a result, the user can derive the vehicle without being concerned about the positions of any other entrance/exits.

Embodiment 7

A map display device in accordance with Embodiment 7 of the present invention has the same structure as the map display device in accordance with Embodiment 1 shown in FIGS. 1 and 2.

Figure 15:
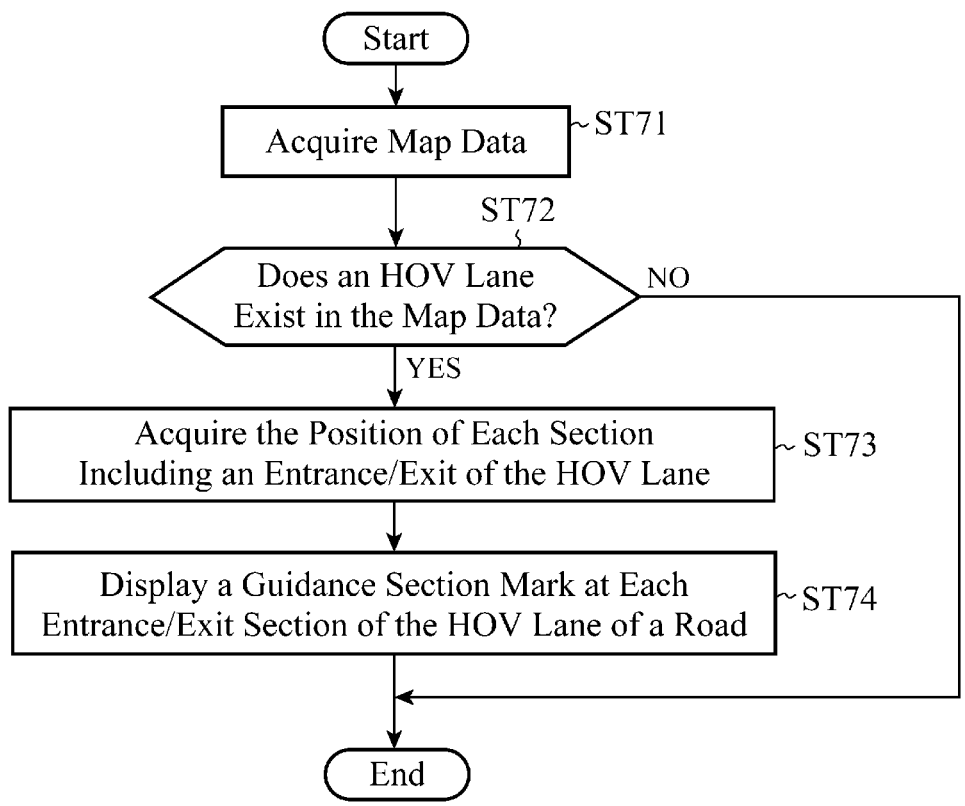
FIG. 15 is a flow chart showing the operation of a map display device in accordance with Embodiment 7 of the present invention, focusing on an HOV lane display process.

Next, the operation of the map display device in accordance with Embodiment 7 of the present invention will be explained with reference to a flow chart shown in FIG. 15, focusing on an HOV lane display process. In the HOV lane display process, map data are acquired first (step ST71). The process of this step ST71 is the same as that of step ST11 of the flow chart shown in FIG. 3.

Whether or not an HOV lane exists in the map data is then checked to see (step ST72). The process of this step ST72 is the same as that of step ST12 of the flow chart shown in FIG. 3. When it is determined in this step ST72 that an HOV lane exists in the map data, the position of an entrance/exit section including an entrance/exit of the HOV lane is then acquired (step ST73). The process of this step ST73 is the same as that of step ST46 of the flow chart shown in FIG. 9.

Figure 16:
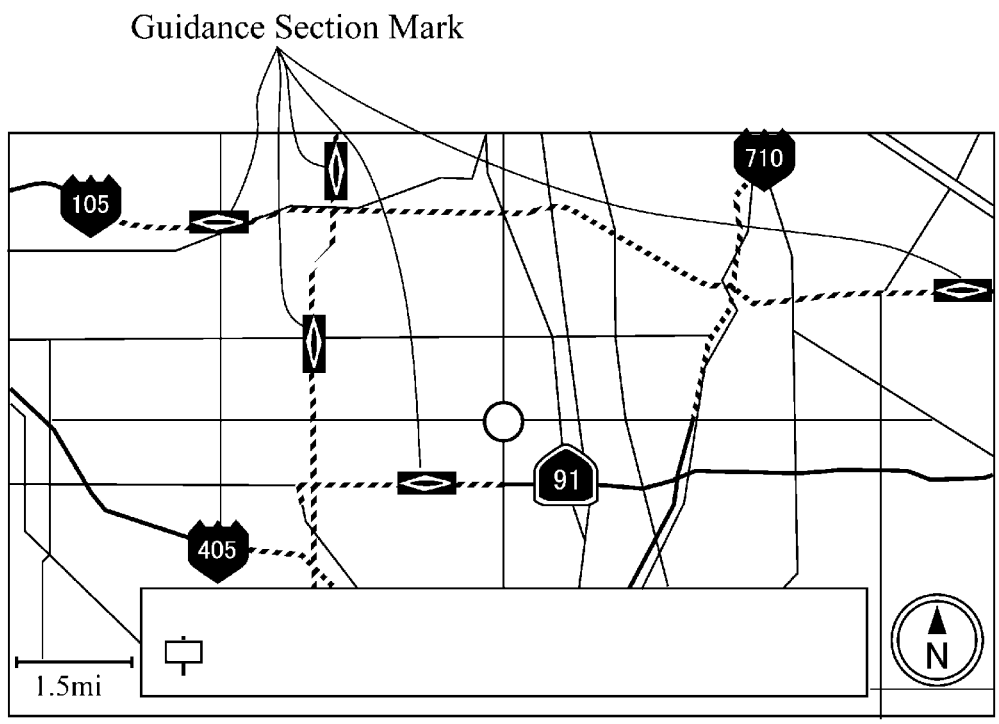
FIG. 16 is a display example of a map displayed on the screen of a display unit in the map display device in accordance with Embodiment 7 of the present invention.

A guidance section mark is then displayed at the entrance/exit section of the HOV lane of the road (step ST74). More specifically, a display processing unit 28 creates display data in which a guidance section mark is drawn at each of the positions shown by the entrance/exit section position data sent thereto from an HOV lane entrance/exit extracting unit 27, the positions being on the road created on the basis of the map data acquired from a map data acquiring unit 21 via a control part 20, and sends the display data to a display unit 6. As a result, the guidance section mark is displayed at the entrance/exit section of the HOV lane of the road on the screen of the display unit 6, as shown in, for example, FIG. 16. After that, the HOV lane display process is ended.

When it is determined, in above-mentioned step ST72, that no HOV lane exists in the acquired map data, the HOV lane display process is ended. In this case, the process of displaying the guidance section mark at each entrance/exit section of an HOV lane of a road is not carried out.

As previously explained, because the map display device in accordance with Embodiment 7 of the present invention displays the guidance section marks each showing one of entrance/exit sections of an HOV lane of a limited-access highway on the map, the user can judge from which entrance he or she should enter the limited-access highway to be able to reach one of the entrances of the HOV lane to travel the HOV lane, and can travel the HOV lane according to the user's judgment.

Embodiment 8

A map display device in accordance with Embodiment 8 of the present invention has the same structure as the map display device in accordance with Embodiment 1 shown in FIGS. 1 and 2.

Figure 17:
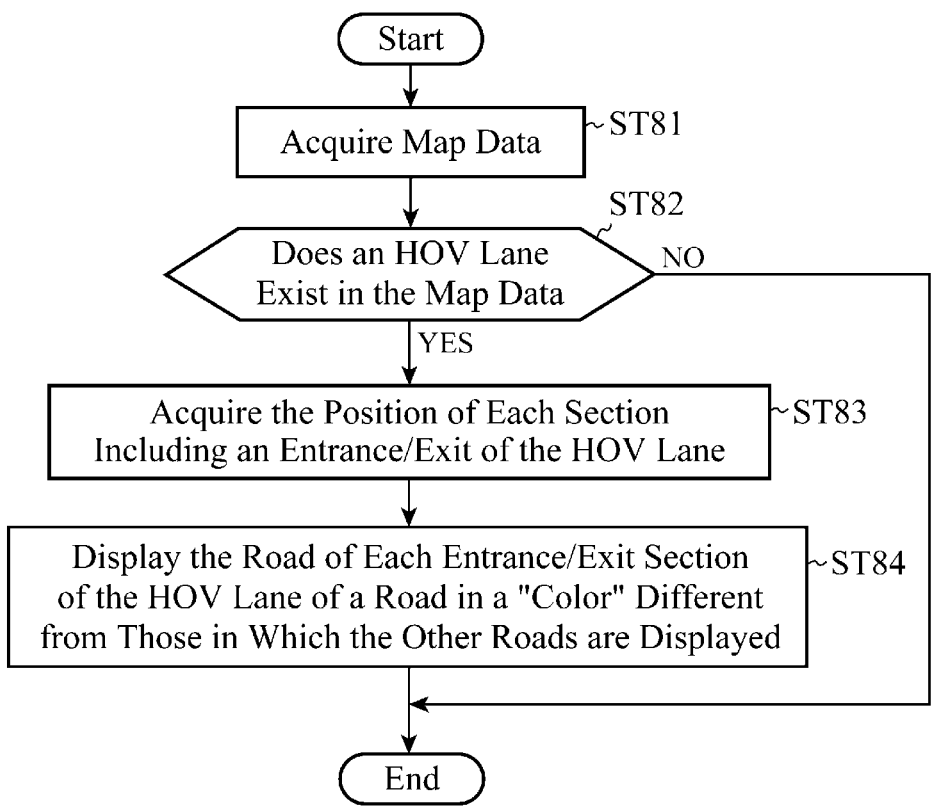
FIG. 17 is a flow chart showing the operation of a map display device in accordance with Embodiment 8 of the present invention, focusing on an HOV lane display process.

Next, the operation of the map display device in accordance with Embodiment 8 of the present invention will be explained with reference to a flow chart shown in FIG. 17, focusing on an HOV lane display process. In the HOV lane display process, map data are acquired first (step ST81). The process of this step ST81 is the same as that of step ST11 of the flow chart shown in FIG. 3.

Whether or not an HOV lane exists in the map data is then checked to see (step ST82). The process of this step ST82 is the same as that of step ST12 of the flow chart shown in FIG. 3. When it is determined in this step ST82 that an HOV lane exists in the map data, the position of an entrance/exit section including an entrance/exit of the HOV lane is then acquired (step ST83). The process of this step ST83 is the same as that of step ST46 of the flow chart shown in FIG. 9.

Figure 18:
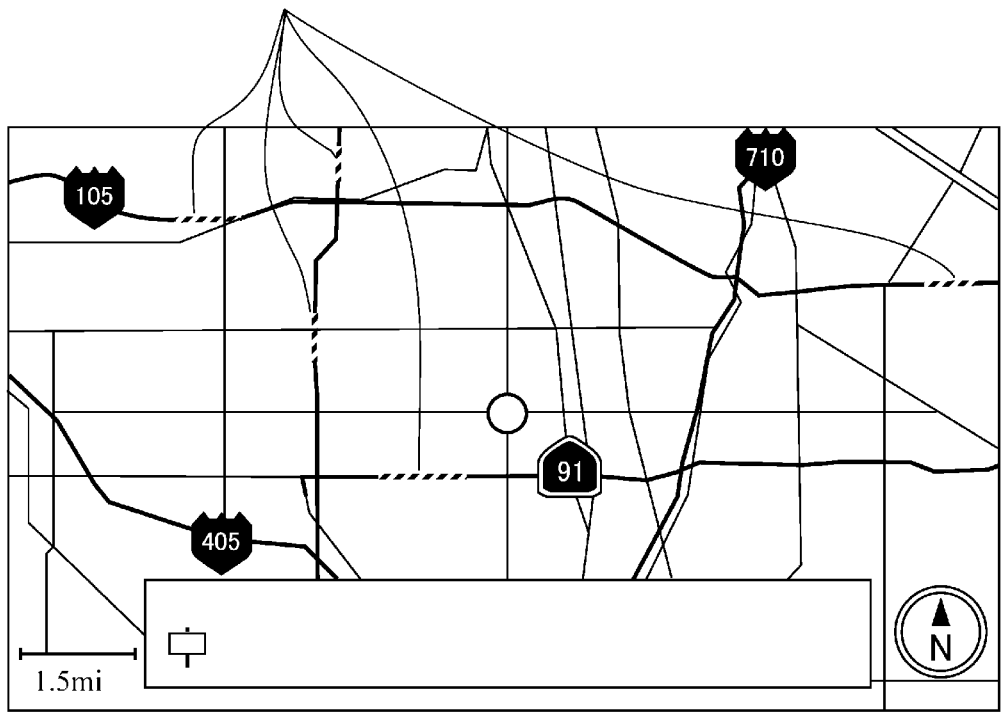
FIG. 18 is a display example of a map displayed on the screen of a display unit in the map display device in accordance with Embodiment 8 of the present invention.

The entrance/exit sections of the HOV lane of the road are then displayed in a "color" different from those in which the other roads are displayed (step ST84). More specifically, a display processing unit 28 creates display data for displaying the road links shown by the link data corresponding to the section shown by the entrance/exit section position data sent from an HOV lane entrance/exit extracting unit 27, the section being included in the road which is created on the basis of the map data acquired from a map data acquiring unit 21 via a control part 20, in a "color" different those in which the other sections of the road are displayed, and sends the display data to a display unit 6. As a result, the section where the entrance/exit of the HOV lane of the road exists is displayed in a "color" different from those in which the other sections of the road are displayed on the screen of the display unit 6, as shown in, for example, FIG. 18. After that, the HOV lane display process is ended.

When it is determined, in above-mentioned step ST82, that no HOV lane exists on the road, the HOV lane display process is ended. In this case, the process of displaying each entrance/exit sections of an HOV lane of a road in a special display form, such as displaying them in a "color" different from those in which the other roads are displayed is not carried out.

As previously explained, because the map display device in accordance with Embodiment 8 of the present invention displays entrance/exit sections of an HOV lane of a limited-access highway on the map, the user can judge from which entrance he or she should enter the limited-access highway to be able to reach one of the entrances of the HOV lane to travel the HOV lane, and can travel the HOV lane according to the user's judgment.

The map display device in accordance with above-mentioned Embodiment 8 is configured in such a way as to display each entrance/exit section of an HOV lane in a "color", as an example of the display form, different from those in which the other sections are displayed. As an alternative, the map display device in accordance with above-mentioned Embodiment 8 can be configured in such a way as to display each entrance/exit section of an HOV lane of a road by using a different display form instead of the "color". For example, the map display device can display each entrance/exit section of an HOV lane of a road with a "width", a "shape", a "degree of brightness", or the like different from those in which the other sections are displayed.

Although the map display device in accordance with any one of Embodiments 1 to 8 explained above is configured in such a way as to always produce a display about an HOV lane when the HOV lane exists on the route, the map display device can be varied to enable the user to operate the input unit 1 to set whether to produce a display about an HOV lane. In this variant, the setting made by the user is sent from the input unit 1 to the control part 20 via the input processing unit 23, and is stored in the control part 20 as an HOV lane display flag.

Figure 19:
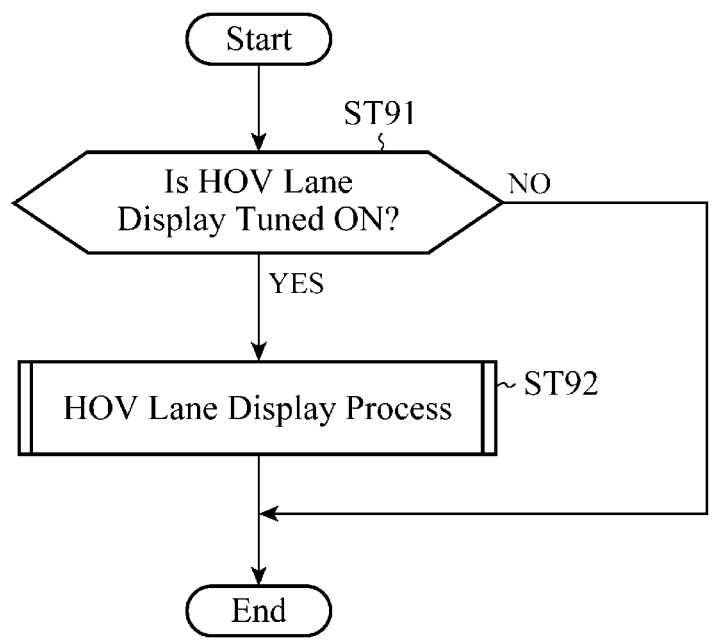
FIG. 19 is a flow chart showing the operation of a map display device in accordance with a variant of any one of Embodiments 1 to 8 of the present invention.

FIG. 19 is a flow chart showing a process performed by the map display device in accordance with this variant. In this process, whether or not the HOV lane display is set to an ON state is checked to see first (step ST91). More specifically, the control part 20 checks to see whether the HOV lane display flag stored therein shows an ON state.

It is determined in this step ST91 that the HOV lane display is set to an ON state, the HOV lane display process is carried out (step ST92). More specifically, the HOV lane display process of the map display device in accordance with any one of above-mentioned Embodiments 1 to 8 is carried out. In contrast, when it is determined, in step ST91, that the HOV lane display is not set to an ON state, the HOV lane display process is not carried out. Because the map display device in accordance with this variant enables the user to cause the map display device to display an HOV lane only when the user requires, the map display device can also respond to user requests for non-display of HOV lanes.

The map display device in accordance with this variant can be varied in such a way as to set ON or OFF to the HOV lane display to each of the HOV lane display processes carried out by the map display devices in accordance with Embodiments 1 to 8. In this case, an HOV lane display flag is provided for each of the HOV lane display processes carried out by the map display devices in accordance with Embodiments 1 to 8, and only the HOV lane display process for which the HOV lane display flag is set to ON is carried out.

More specifically, according to the setting of the HOV lane display flag, the display processing unit 28 carries out at least one of creation of display data for superimposing a symbol showing an HOV lane on a road formed of link data including HOV lane information when the HOV lane determining unit 26 determines that the HOV lane information is included in the link data, creation of display data for displaying a route formed of link data including HOV lane information in a display form different from that in which a route formed of link data not including any HOV lane information is displayed when the HOV lane determining unit 26 determines that the HOV lane information is included in the link data, creation of display data for displaying a road formed of link data including HOV lane information in a display form different from that in which a road formed of link data not including any HOV lane information when the HOV lane determining unit 26 determines that the HOV lane information is included in the link data, creation of display data for displaying each of sections respectively including entrance/exits extracted by the HOV lane entrance/exit extracting unit 27 as a guidance section mark, creation of display data for displaying a road link shown by link data corresponding to each of the sections respectively including the entrance/exits extracted by the HOV lane entrance/exit extracting unit 27 in a display from different from that of a road link shown by link data not corresponding to the sections respectively including the entrance/exits, creation of display data for displaying a guide point mark showing a first exit or entrance on a route, and a guide point mark showing a last exit or entrance on the route, the first and last entrance/exits being included in the entrance/exits extracted by the HOV lane entrance/exit extracting unit, creation of display data for displaying a road formed of link data including HOV lane information in a display form different from that in which a road formed of link data not including any HOV lane information and also displaying each of the sections respectively including the entrance/exits extracted by the HOV lane entrance/exit extracting unit 27 as a guidance section mark when the HOV lane determining unit 26 determines that the HOV lane information is included in the link data, and creation of display data for displaying a road formed of link data including HOV lane information in a display form different from that in which a road formed of link data not including any HOV lane information and also displaying a road link shown by link data corresponding to each of the sections respectively including the entrance/exits extracted by the HOV lane entrance/exit extracting unit 27 in a display from different from that of a road link shown by link data not corresponding to the sections respectively including the entrance/exits when the HOV lane determining unit 26 determines that the HOV lane information is included in the link data.

Because the map display device enables the user to switch among the plural HOV lane display modes according to this configuration, the map display device can display only information required by the user to enable the user to understand the information correctly.

INDUSTRIAL APPLICABILITY

As mentioned above, because in order to enable the user to recognize an HOV lane on the map displayed on the screen visually and easily, the map display device in accordance with the present invention includes: the map data acquiring unit for acquiring map data; the HOV lane determining unit for determining whether or not HOV lane information showing that an HOV lane exists is included in link data defining roads included in the map data acquired by the map data acquiring unit; the display processing unit for, when the HOV lane determining unit determines that HOV lane information is included in the link data, creating display data showing that a symbol showing an HOV lane is superimposed on a road formed by the link data including the HOV lane information; and the display unit for displaying a map on the basis of the display data created by the display processing unit, the map display device can be applied to a mounted navigation device and is particularly suitable for use as a map display device or the like which uses map information including HOV lane information.

The invention claimed is:

1. A map display control apparatus comprising:
a controller that executes a process that does not use any searched route to display a map of an area around a vehicle's detected position;
a map data acquiring unit that, as part of the process that does not use any searched route, acquires map data corresponding to the map of an area around a vehicle's detected position to be displayed on a screen of a display device according to the process that does not use any searched route;
an HOV lane entrance/exit extracting unit that, as part of the process that does not use any searched route, extracts each entrance/exit of an HOV lane, which allows a driver to enter/exit the HOV lane to/from a non-HOV lane, within the area of the map based on the map data; and
a display processing unit that, as part of the process that does not use any searched route, creates display data for displaying indicia of all entrance/exits of the HOV lane extracted by the HOV lane entrance/exit extracting unit on the map displayed on the display device according to the process that does not use any searched route,
wherein the indicia points out respective locations on the map displayed on the display device of all entrance/exits of the HOV lane extracted by the HOV lane entrance/exit extracting unit.

2. The map display control apparatus according to claim 1, wherein the display processing unit creates display data for displaying each extracted entrance/exit of the HOV lane as a mark.

3. The map display control apparatus according to claim 1, wherein the display processing unit creates display data for displaying a road link shown by link data corresponding to each extracted entrance/exit of the HOV lane in a display form different from that in which a road link shown by link data not corresponding to the entrance/exit of the HOV lane is displayed.

4. The map display control apparatus according to claim 1, further comprising an input unit for commanding whether or not to display the entrance/exits of the HOV lane, wherein the display processing unit, in response to a command from the input unit, creates the display data.

5. The map display control apparatus according to claim 3, wherein the display processing unit creates display data for displaying the road link shown by the link data corresponding to each extracted entrance/exit of the HOV lane by using a line having a color, a width, a shape or brightness different from that of the road link shown by the link data not corresponding to the entrance/exit of the HOV lane.

6. A map display control apparatus comprising:
a processor configured to execute a program, which performs a process that does not use any searched route to display a map of an area around a vehicle's detected position; and
a memory that stores the program which, when executed by the processor, results in performance of steps comprising:
acquiring, as part of the process that does not use any searched route, map data corresponding to the map of an area around a vehicle's detected position to be displayed on a screen of a display according to the process that does not use any searched route,
extracting, as part of the process that does not use any searched route, each entrance/exit of an HOV lane, which allows a driver to enter/exit the HOV lane to/from a non-HOV lane, within the area of the map based on the map data, and
creating, as part of the process that does not use any searched route, display data for displaying indicia of all extracted entrance/exits of the HOV lane on the map displayed on the display according to the process that does not use any searched route,
wherein the indicia points out respective locations on the map displayed on the display device of all extracted entrance/exits of the HOV lane.

7. The map display control apparatus according to claim 6, wherein the display data is created for displaying each extracted entrance/exit of the HOV lane as a mark.

8. The map display control apparatus according to claim 6, wherein the display data is created for displaying a road link shown by link data corresponding to each extracted entrance/exit of the HOV lane in a display form different from that in which a road link shown by link data not corresponding to the entrance/exit of the HOV lane is displayed.

9. The map display control apparatus according to claim 8, wherein the display data is created for displaying the road link shown by the link data corresponding to each extracted entrance/exit of the HOV lane by using a line having a color, a width, a shape or brightness different from that of the road link shown by the link data not corresponding to the entrance/exit of the HOV lane.

10. The map display control apparatus according to claim 6, wherein the performed steps further comprise receiving an input for commanding whether or not to display the entrance/exits of the HOV lane, wherein the display data, in response to the input, is created.

11. A map display control method comprising:
utilizing a controller to execute a process that does not use any searched route to display a map of an area around a vehicle's detected position;
acquiring, as part of the process that does not use any searched route, map data corresponding to the map of an area around a vehicle's detected position to be displayed on a screen of a display according to the process that does not use any searched route;
extracting, as part of the process that does not use any searched route, each entrance/exit of an HOV lane, which allows a driver to enter/exit the HOV lane to/from a non-HOV lane, within the area of the map based on the map data; and
creating, as part of the process that does not use any searched route, display data for displaying indicia of all extracted entrance/exits of the HOV lane on the map displayed on the display according to the process that does not use any searched route,
wherein the indicia points out respective locations on the map displayed on the display device of all extracted entrance/exits of the HOV lane.

12. The map display control method according to claim 11, wherein the display data is created for displaying each extracted entrance/exit of the HOV lane as a mark.

13. The map display control method according to claim 11, wherein the display data is created for displaying a road link shown by link data corresponding to each extracted entrance/exit of the HOV lane in a display form different from that in which a road link shown by link data not corresponding to the entrance/exit of the HOV lane is displayed.

14. The map display control method according to claim 13, wherein the display data is created for displaying the road link shown by the link data corresponding to each extracted entrance/exit of the HOV lane by using a line having a color, a width, a shape or brightness different from that of the road link shown by the link data not corresponding to the entrance/exit of the HOV lane.

15. The map display control method according to claim 11, wherein the performed steps further comprise receiving an input for commanding whether or not to display the entrance/exits of the HOV lane, wherein the display data, in response to the input, is created.

* * * * *